United States Patent
Natt et al.

(10) Patent No.: US 9,149,163 B2
(45) Date of Patent: Oct. 6, 2015

(54) TOILET

(75) Inventors: Christopher David Natt, Greater London (GB); Christopher James Holden, London (GB); Virginia Summerfield Gardiner, London (GB); Darren Mark Brown, London (GB); Iain James Purves, Leicester (GB)

(73) Assignee: LOOWATT LTD, London, Greater London (GB)

( * ) Notice: Subject to any disclaimer, the term of this patent is extended or adjusted under 35 U.S.C. 154(b) by 412 days.

(21) Appl. No.: 13/698,638

(22) PCT Filed: May 23, 2011

(86) PCT No.: PCT/GB2011/050971
§ 371 (c)(1),
(2), (4) Date: Jan. 29, 2013

(87) PCT Pub. No.: WO2011/144950
PCT Pub. Date: Nov. 24, 2011

(65) Prior Publication Data
US 2013/0125301 A1  May 23, 2013

(30) Foreign Application Priority Data
May 21, 2010 (GB) .................................. 1008511.6

(51) Int. Cl.
*A47K 11/02* (2006.01)

(52) U.S. Cl.
CPC ............... *A47K 11/02* (2013.01); *A47K 11/026* (2013.01)

(58) Field of Classification Search
CPC ...... A47K 11/026; A47K 11/02; B29C 65/00; B29C 66/83421; B29C 66/83433
USPC ................... 119/170; 53/551, 550; 4/DIG. 19
See application file for complete search history.

(56) References Cited

U.S. PATENT DOCUMENTS

| | | | | |
|---|---|---|---|---|
| 3,751,735 A | * | 8/1973 | Sargent et al. | 4/318 |
| 4,519,104 A | | 5/1985 | Nilsson | |
| 5,454,208 A | * | 10/1995 | Kawano | 53/410 |
| 5,884,346 A | | 3/1999 | Hengl | |
| 6,052,842 A | * | 4/2000 | He | 4/484 |

FOREIGN PATENT DOCUMENTS

| | | |
|---|---|---|
| CH | 525134 A | 7/1972 |
| EP | 0906743 A1 | 4/1999 |
| FR | 2775179 A1 | 8/1999 |
| GB | 1294129 A | 10/1972 |
| NL | 1019558 C2 | 6/2003 |
| WO | WO 2004/004530 A1 | 11/2011 |

OTHER PUBLICATIONS

International Search Report dated Jul. 27, 2011 for PCT/GB2011/050971.
United Kingdom Search Report dated Aug. 17, 2010 for GB1008511.6.

* cited by examiner

*Primary Examiner* — Janie Christiansen
(74) *Attorney, Agent, or Firm* — Sullivan & Worcester LLP

(57) ABSTRACT

A toilet, wherein: the toilet has an aperture (110), which, in use, would be located in an upper part of the toilet; the toilet comprising or adapted to receive a dispensing means arranged beneath the aperture for dispensing a tube (12) of collection bag material in a downward direction; wherein the toilet is adapted such that, in operation, while the tube is moved downward, the toilet creates a divide in the tube by pressing the sides of the tube together.

20 Claims, 9 Drawing Sheets

TOILET

FIELD OF THE INVENTION

The present invention relates to a toilet that does not require a water flushing system.

BACKGROUND

Conventional toilets typically have a water-flushing system which, when operated, can flush waste down a drainage pipe. However, water flushing systems are not always convenient, for example if water in a particular area is scarce or if it is difficult to connect a toilet to a drainage system. Water-flushing systems are also inappropriate in portable toilet systems.

Various alternatives to water-flushing toilets have been proposed in the prior art. An example of such a toilet is given in US 2009/0255045. This document relates to a portable toilet apparatus having a flexible bag-like container in the form of a tube that can accept waste. The bag is of a continuous sort, such that the open end of the bag is folded and stored in a concertina fashion in an annular shape, the annular shape corresponding to an open aperture in the top of the toilet. The continuous bag can be fed downwards through the toilet housing via feed rolls that pinch the edge of the bag. The toilet in this document hermetically seals the waste in the bag using a heat sealer.

A further example of a toilet is given in US 2009/0165196. The toilet apparatus is similar to that described in US 2009/0255045 in having a continuous bag that can be fed by rollers downwards through a housing and heat-sealed when required. This toilet further includes a processing material that can be added to the waste. The processing material absorbs liquid in order to semi-solidify excrement, such that it can be used, for example, as combustible fuel.

While the above-described toilets of may provide an alternative to water-flushing toilets, they have certain disadvantages. It is an aim of the present invention to provide at least an alternative to, and ideally an improvement on, such toilets.

SUMMARY OF THE INVENTION

In an embodiment, the present invention provides: a toilet, wherein
the toilet has an aperture, which, in use, would be located in an upper part of the toilet;
the toilet comprising or adapted to receive a dispensing means arranged beneath the aperture for dispensing a tube of collection bag material in a downward direction;
wherein the toilet is adapted such that, in operation, while the tube is moved downward, the toilet creates a divide in the tube by pressing the sides of the tube together. The aperture is typically an aperture for accepting solid and liquid waste into the toilet. Solid and liquid waste deposited in the aperture would typically fall into the tube of collection bag material.

In an embodiment, the present invention provides a toilet, wherein:
the toilet has an aperture, which, in use, would be located in an upper part of the toilet;
the toilet comprising or adapted to receive a dispensing means arranged beneath the aperture for dispensing a tube of collection bag material in a downward direction;
and the toilet comprises a dividing means, the dividing means being adapted such that, in operation, while the tube is moved downward, the dividing means creates a divide in the tube by pressing the sides of the tube together, wherein the dividing means prevents one or more of solid waste, liquid waste and odour passing through the divide. In operation, the tube may have an upper part and a lower part separated by the divide. The divide may prevent one or more of solid waste, liquid waste and odour passing from the upper part of the tube to the lower part of the tube through the divide. The dividing means (that is adapted such that, in operation, while the tube is moved downward, the dividing means creates a divide in the tube by pressing the sides of the tube together and wherein the dividing means prevents one or more of solid waste, liquid waste and odour passing through the divide) may otherwise be termed a first dividing means herein. The first dividing means may extend laterally across at least part of the width of the tube, optionally across the whole width of the tube.

In an embodiment, the present invention provides a toilet wherein:
the toilet has an aperture, which, in use, would be located in an upper part of the toilet;
the toilet comprising or adapted to receive a dispensing means arranged beneath the aperture for dispensing a tube of collection bag material in a downward direction;
and the toilet comprises a dividing means, the dividing means adapted such that, in operation, while the tube is moved downward, the dividing means creates a vertical divide in the tube by pressing the sides of the tube together. In the context of this embodiment, "vertical" indicates when, in use, a lower part or bottom of the tube is located directly below an opening of the tube. The vertical divide in the tube may be a permanent vertical divide. The vertical divide preferably divides the tube into a first portion and a second portion as the tube is drawn downwards. The first and second portions would, in use, be located below the second dividing means and, if present, the first dividing means. The dividing means adapted, in use, to form the vertical divide in the tube may be a termed a second dividing means herein. In this embodiment, the toilet optionally further comprises the first dividing means described above.

In an embodiment, if the dividing means forms a seal in the sides of the tube, the dividing means may be termed a sealing means. Likewise, if the dividing member(s) described below, in operation, form a seal in the sides of the tube, the dividing member(s) may be termed sealing member(s). In an embodiment, the dividing means may termed gripper means. Likewise, the dividing member(s) described below, may be termed gripper member(s).

The toilet in the embodiments mentioned above may comprise a housing. The housing may partially or completely enclose the tube. The housing may define the aperture.

Optionally, the toilet of the present invention is adapted to separate liquid and solid waste. Preferably, the toilet of the present invention is adapted to separate liquid and solid waste, such that they can be stored separately within the toilet. In the second aspect, preferably, the second dividing means divides the tube into a first portion and a second portion, and the toilet is adapted to separate liquid and solid waste that may be deposited through the aperture, such that the solid waste is stored in the first portion of the tube and the liquid waste is stored in the second portion of the tube. The toilet may be adapted to separate liquid and solid waste that may be deposited through the aperture, such that, when the tube is being moved downwards the solid waste is passed to the first portion of the tube and, when the tube is not being moved downward, the liquid waste is passed to the second portion of the tube.

DETAILED DESCRIPTION OF THE INVENTION

Figure 1:
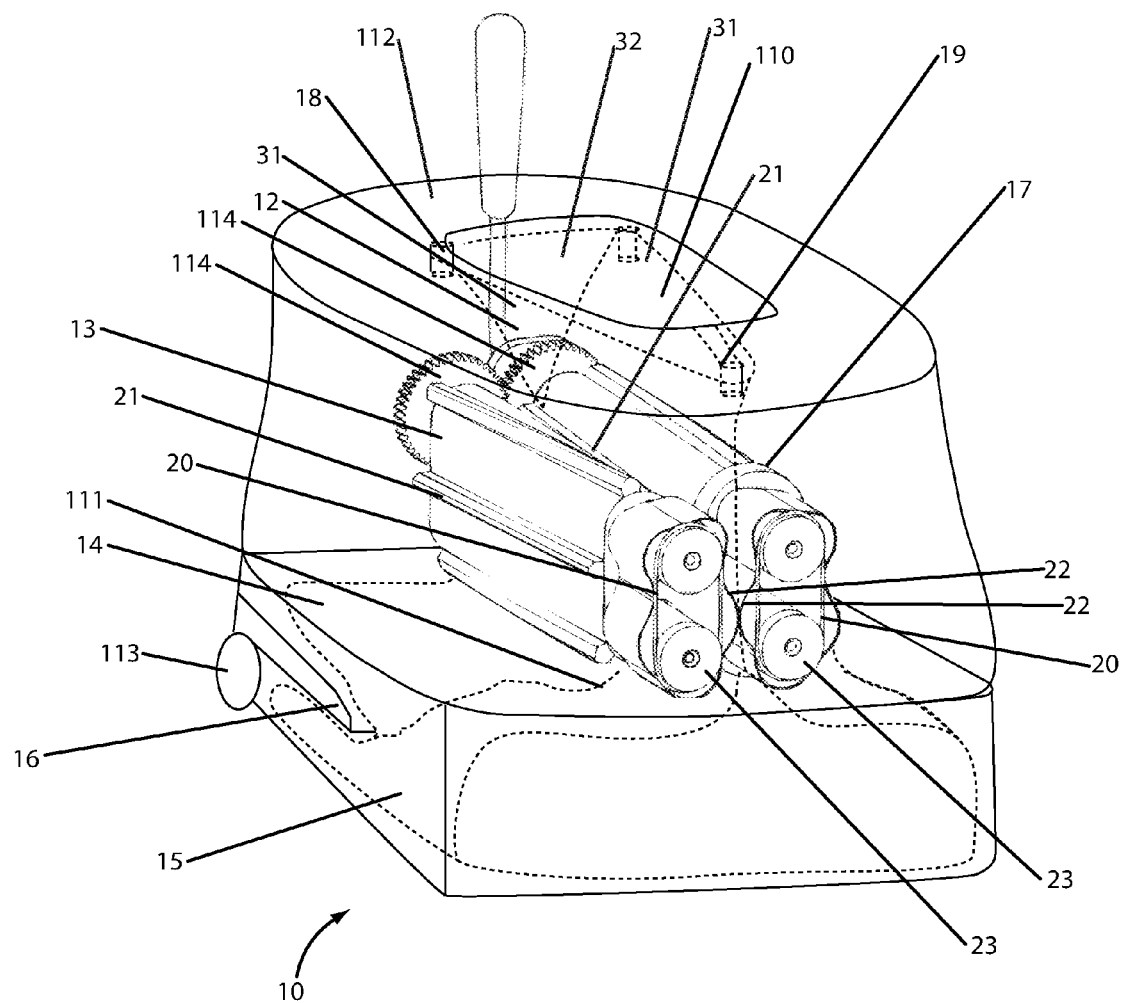
FIG. 1 shows an embodiment of the toilet of the present invention within which the dividing means is located.

The present inventors have found that the toilets of the prior art described above, for example those described in US 2009/0165196 and US 2009/0255045, have certain disadvantages. For example, if used for urination, urine is collected in the bag. If one then wishes to contain the odour of the urine within the bag, it is necessary to seal the bag and move it downwards for its next use. Since most of the visits of a human to a toilet are generally for urination, a considerable amount of packaging (i.e. the bag) would be used in US US 2009/0165196 and US 2009/0255045 to contain the urine.

The toilets described in US 2009/0165196 and US 2009/0255045 also have separate mechanisms for conveying the bag downwards and sealing the bag. This can complicate the mechanism of the toilet, increasing expense and decreasing the ease with which the toilet can be manufactured.

The toilets described in US 2009/0165196 and US 2009/0255045 have a single bag for containing all waste together, for example faeces and urine. This has a number of disadvantages. It generally will increase the undesirable odour of the waste as the urine and faeces react over a period of time to produce pungent gases. Additionally, if one wishes to use urine or faeces, each is ideally separated from the other. Urine may be used, for example, as fertilizer. Faeces may be used for purposes such as compost or fuel (e.g. combustible waste). It is therefore desirable to remove as much urine as possible from the faeces and/or as much faeces as possible from the urine.

Embodiments of the present invention address at least some of the problems associated with the toilets of the prior art, such as those described above.

In an embodiment, the present invention provides: a toilet, wherein:
the toilet has an aperture, which, in use, would be located in an upper part of the toilet;
the toilet comprising or adapted to receive a dispensing means arranged beneath the aperture for dispensing a tube of collection bag material in a downward direction;
wherein the toilet is adapted such that, in operation, while the tube is moved downward, the toilet creates a divide in the tube by pressing the sides of the tube together. The aperture is typically an aperture for accepting solid and liquid waste into the toilet. Solid and liquid waste deposited in the aperture would typically fall into the tube of collection bag material.

In an embodiment, the present invention provides a toilet, wherein:
the toilet has an aperture, which, in use, would be located in an upper part of the toilet;
the toilet comprising or adapted to receive a dispensing means arranged beneath the aperture for dispensing a tube of collection bag material in a downward direction;
and the toilet comprises a dividing means, the dividing means being adapted such that, in operation, while the tube is moved downward, the dividing means creates a divide in the tube by pressing the sides of the tube together, wherein the dividing means prevents one or more of solid waste, liquid waste and odour passing through the divide. In operation, the tube may have an upper part and a lower part separated by the divide. The divide may prevent one or more of solid waste, liquid waste and odour passing from the upper part of the tube to the lower part of the tube through the divide. The dividing means (that is adapted such that, in operation, while the tube is moved downward, the dividing means creates a divide in the tube by pressing the sides of the tube together and wherein the dividing means prevents one or more of solid waste, liquid waste and odour passing through the divide) may otherwise be termed a first dividing means herein. The first dividing means may extend laterally across at least part of the width of the tube, optionally across the whole width of the tube.

In an embodiment, the present invention provides a toilet wherein:
the toilet has an aperture, which, in use, would be located in an upper part of the toilet;
the toilet comprising or adapted to receive a dispensing means arranged beneath the aperture for dispensing a tube of collection bag material in a downward direction;
and the toilet comprises a dividing means, the dividing means is adapted such that, in operation, while the tube is moved downward, the dividing means creates a vertical divide in the tube by pressing the sides of the tube together. In the context of this embodiment, "vertical" indicates when, in use, a lower part or bottom of the tube is located directly below an opening of the tube. The vertical divide in the tube may be a permanent vertical divide. The vertical divide preferably divides the tube into a first portion and a second portion as the tube is drawn downwards. The first and second portions would, in use, be located below the second dividing means and, if present, the first dividing means. The dividing means adapted, in use, to form the vertical divide in the tube may be a termed a second dividing means herein. In this embodiment, the toilet optionally further comprises the first dividing means described above.

An advantage of embodiments of the present invention is that the same means can provide a divide in the tube, preferably a seal between sides of the tube, and can draw the tube downwards, which avoids the need to have both a separate dividing means (e.g. a sealing means) and a separate mechanism for conveying the tube. This simplifies operation of the toilet, since a single action can be used to form a divide in the tube (e.g. a seal between the sides of the tube) and move it downwards.

Optionally, the toilet of the present invention is adapted to separate liquid and solid waste. Preferably, the toilet of the present invention is adapted to separate liquid and solid waste, such that they can be stored separately within the toilet, and, if present, within the housing of the toilet. In embodiments having a second dividing means, preferably, the second dividing means divides the tube into a first portion and a second portion, and the toilet is adapted to separate liquid and solid waste that may be deposited through the aperture, such that the solid waste is stored in the first portion of the tube and the liquid waste is stored in the second portion of the tube. Preferably, first and second portions of the tube are separated by a divide in the tube, optionally a seal between the sides of the tube, that can prevent solid and liquid waste passing though the divide or seal.

Optionally, the toilet comprises a removable receptacle that can contain the tube. If the toilet comprises a housing, the removable receptacle may be located within the housing. The receptacle is ideally located below the first and/or second dividing means. The removable receptacle is preferably automatically sealed on removal from the toilet.

The toilet may comprise a substantially annular seat that defines the aperture of the toilet. The seat may be in the form of an open or closed ring, wherein said open or closed ring defines the aperture. The toilet and seat is preferably sized such that it is comfortable for a human to sit on the seat. The human may be of any age or size within normal biological limits.

The dispensing means may comprise any suitable means for dispensing the tube of collection bag material. Such dispensing means are known in the prior art. Preferably the tube has two ends, one of which is sealed and the other of which is open and, in use, can accept solid or liquid waste. The dispensing means may be removable from the toilet. The tube typically will have an opening and the opening may define the aperture of the toilet. The dispensing means may comprise a tube, e.g. a bag, that has sides that are compacted in an annular fashion around the opening of the tube or bag such that, in use, the opening of the tube or bag corresponds with the aperture in the toilet, and the compacted sides around the opening of the tube or bag can be stored in an annular portion of the toilet, allowing the sides to be drawn down from the compacted portion of the tube as required. Optionally, the tube or bag has sides that are folded in an annular fashion at the opening of the tube or bag. The sides may be folded in a concertina manner in an annular fashion around the opening of the tube or bag, allowing easy unfolding of the tube or bag. The dispensing means may further comprise a cartridge that can store the compacted portion of the tube or bag and can allow the tube or bag to be dispensed from the cartridge as required.

The tube comprises a collection bag material. The tube may be made of any suitable material. The tube is preferably a flexible material, such as a material suitable for forming a bag for accepting waste. The tube may comprise a flexible polymer, for example polyethylene. The tube preferably comprises a biodegradable polymer. The biodegradable polymer is preferably a polymer that meets one or both of European standards, EN 13432 or EN 14995. Polymers meeting these standards are commercially available. The tube and/or polymer preferably has low gas permeability. The polymer preferably has the ability to support and/or increase methane production from waste, e.g. faeces, in an anaerobic environment. Optionally an adhesive may be present on one or more interior sides of the tube or bag. Such adhesive may be a pressure adhesive. The pressure adhesive may form a permanent divide in the tube, or a permanent seal between the sides of the tube, when the sides of the tube or bag are pressed together, for example by the engaging first and second engagement means or engaging first and/or second dividing members. Optionally, the adhesive may be activated by a heat seal. Optionally, the adhesive may be a heat-seal adhesive. Such adhesives are available commercially.

The toilet is preferably adapted such that the divide created by the first dividing means in the tube (e.g. a seal created between the sides of the tube), in use, extends across at least part of the width of the tube, to divide the tube into an upper portion located above the divide and a lower portion located below the divide. The divide created by the first dividing means preferably extends across the entire width of the tube to completely divide or separate the lower portion of the tube from the upper portion of the tube. If the second dividing means is present, such that a vertical divide is formed in the tube as it is drawn downwards dividing the tube into first and second portions, preferably, the divide formed by the first dividing means extends at least across the entire width of the first portion of the tube and optionally across the entire width of the second portion of the tube. In an embodiment, the first dividing means may comprise a means that can acts as a valve across at least part of the width of the second portion of the tube, to allow liquid waste to flow downwards to the second portion of the tube, and when liquid waste is not flowing downwards to the second portion of the tube, forms a divide in the tube, which may be a seal between the sides of the tube, across the second portion of the tube by pressing the sides of the tube together.

In an embodiment, the first dividing means is adapted, when not drawing the tube downwards, to substantially prevent solid waste passing through the divide in the tube to the bottom of the tube, while allowing liquid waste to pass through the first dividing means to a liquid storage means located below the divide. When the tube is drawn downwards, solid waste is drawn down with the tube, such that it is then stored, in use, in a lower part of the tube. Due to the divide formed by the first dividing means above the lower part of the tube, odour is prevented from escaping from the lower part of the tube. The liquid storage means may store the liquid waste substantially separately from the solid waste that has passed through the divide. The liquid storage means may comprise a second part of the tube that is separated from a first part of the tube that receives the solid waste through the first dividing means. Optionally, the first and second parts of the tube are separated by a vertical divide (vertical when the bottom of the tube is directly below the opening of the tube). It is an advantage to be able to store liquid waste, such as urine, separately from solid waste, such as faeces. Each of the urine and faeces can be used separately for desired purposes, such as fuel or fertilizer. Separating the solid and liquid waste also reduces the odour of the waste.

Figure 3:
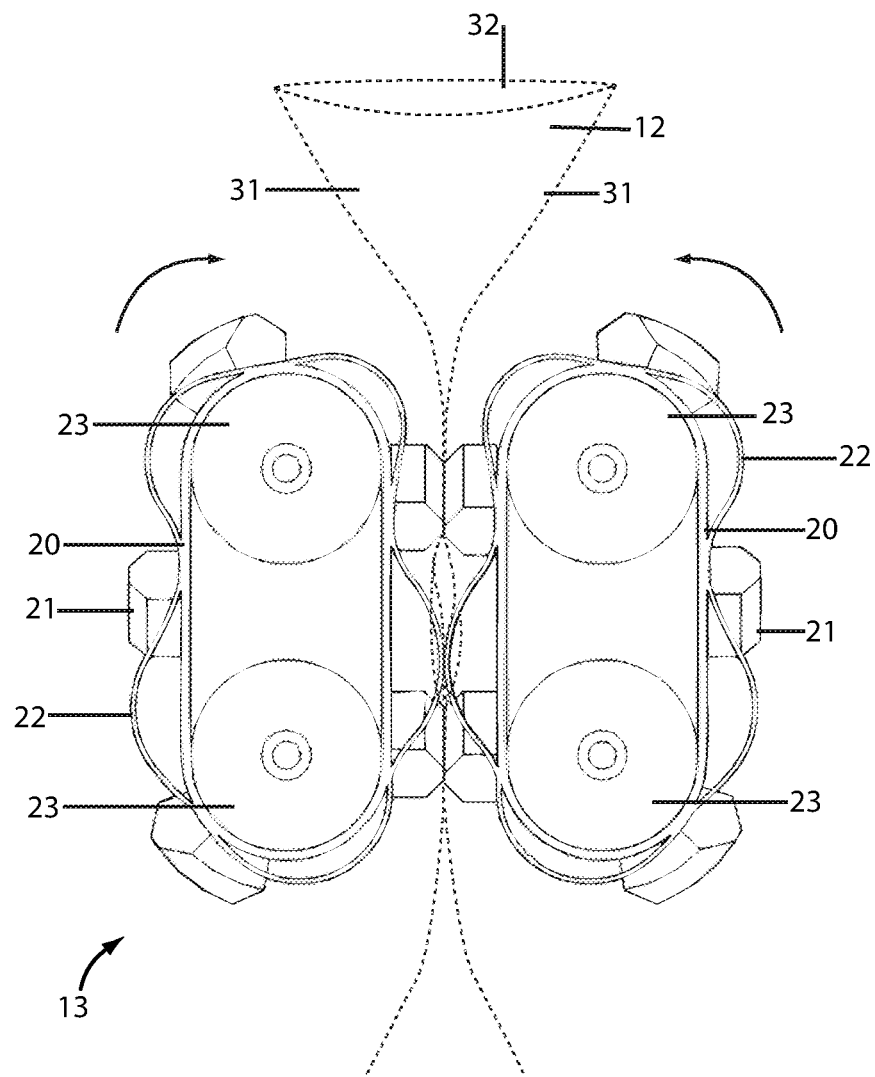
FIG. 3 shows an embodiment of a dividing means of the present invention.

In an embodiment, the first dividing means comprises two opposing first and second engagement means, the first and second engagement means, in use, located on opposite sides of the tube, the first and second engagement means movable from a first position to a second position to a third position. In the first position the engagement means are sufficiently separated from one another such that they do not form a divide in the tube, i.e. they do not press the sides of the tube together. In the second and third positions the engagement means are sufficiently close to one another that the divide is formed by pressing the sides of the tube together. The third position is located below the second position. The engagement means may then be movable back to the first position from the third position. This is illustrated in one embodiment shown in FIG. 4. The conveyors, which are in the form of belts, are shown separated in this Figure for clarity, but in use would engage as shown in FIGS. 1 and 3. The first and second engagement means are in the form of first dividing members (21) which form ridges across the outer surface of belts (410, 412). These first and second engagement means move with the belt. In a first position (A), the first and second engagement means are sufficiently separated from one another such that they do not form a divide in the tube, e.g. a seal between the sides of the tube. As the belt moves (clockwise for the left hand belt, anticlockwise for the right hand belt), the first and second engagement means move from the first position (A) to a second position (B) to a third position (C). In the second and third positions, (B and C, respectively) the first and second engagement means are sufficiently close to one another that a divide in the tube is formed between each pair of engaging engagement means by pressing the sides of the tube together. The third position (C) is located below the second position (B). As the rollers rotate, the first and second engagement means move from the third position (C) back to the first position (A).

In an embodiment, the engagement means are elongated and, at least in the second position, have an upper surface angled away from the horizontal, such that liquid waste can flow along the divide in the tube to a liquid storage means located below the divide. The engagement means may comprise the first and/or second dividing members on the first and second movable supports described below.

In an embodiment, the first dividing means comprises first and second movable supports for accepting the tube between them, each of the first and second movable supports having a plurality of corresponding first dividing members thereon, adapted such that, on moving the movable supports in a certain direction, one or more first dividing members from the first movable support engages with one or more corresponding first dividing members from the second movable support to press the sides of the tube together to form the divide in the tube and draw the tube downwards. Each of first and second movable supports may, for example, comprise or be a rotatable body, e.g. a cylinder, or may comprise or be conveyors, which may, for example, be driven by rollers. Each conveyor may form a loop that can be driven around in a continuous path, for example by one or more rollers. The conveyors may comprise a belt, which may be driven by rollers. The belt may form a closed loop. Preferably, the first and second movable supports comprise conveyors, which may comprise a belt, each of the first and second conveyors being driven by two rollers, which are preferably cylindrical, each of the rollers rotating about an axis that is parallel to the other roller driving the same conveyor. The first and second conveyors preferably engage, so that a part of the first conveyor that extends between the rollers driving the first conveyor engages with a part of the second conveyor that extends between the rollers driving the second conveyor. The rollers are preferably adapted such that they cooperate and rotate at the same speed (revolutions per minute). If first and second belts are driven by rollers, where each of first and second belts have first dividing members thereon, preferably the toilet is adapted such that the movement of the belts is such that, when the first members on the belts, they are moved together at the same speed. The rollers may have protrusions thereon that cooperate with corresponding indentations on an inner surface of the conveyors, to increase grip between the rollers and conveyors.

In an embodiment, the movable supports are located upon and driven by one or more sprocket wheels, which have teeth that engage with corresponding apertures in the movable supports. In an embodiment, the movable supports comprise chains, having first and/or second dividing members disposed thereon. In an embodiment, the first and seconds movable supports each comprises two chains, each chain running on two or more sprocket wheels, wherein each sprocket wheel for one of the chains runs on the same axis as a sprocket wheel on the other of the chains.

The first conveyor may be driven by at least one roller and second conveyor may be driven by at least one roller. The at least one roller that drives the first conveyor may cooperate with the at least one roller that drives the second conveyor by suitable means, such as cogs located on the axis of each roller, or by conveyors.

The first and second movable supports may have guide means located thereon which, when a divide in the tube is formed by the dividing members, cooperate with peripheral edges of the tube to ensure that the peripheral edges stay substantially in the same position as the tube is drawn downwards. The guide means may, for example, comprise a plurality of protrusions located around a circumference of each first and second movable support that cooperate with holes located in a peripheral edge of the tube. Alternatively, the tube may have peripheral edges that are thicker than the sides of the tube located therebetween, such that, when a divide is formed by the first dividing means in the tube, the peripheral edges of the tube extend beyond the first and, if present, second dividing members, such that the peripheral edges stay substantially in the same position as the tube is drawn downwards.

In an embodiment, the first dividing means comprises first and second movable supports for accepting the tube between them, each of the first and second movable supports having a plurality of corresponding first dividing members thereon, adapted such that, on moving the movable supports in a certain direction, one or more first dividing members from the first movable support engages with one or more corresponding first dividing members from the second movable support to press the sides of the tube together to form the divide in the tube and draw the tube downwards.

In an embodiment, the first dividing means comprises first and second movable conveyors for accepting the tube between them, each of the first and second conveyors having a plurality of corresponding first dividing members thereon, adapted such that, on moving the conveyors in a certain direction, one or more first dividing members from the first conveyor engages with one or more corresponding first dividing members from the second conveyor to press the sides of the tube together to form the divide in the tube and draw the tube downwards. The first and second movable conveyors may, for example, comprise belts driven on rollers.

As described above, in an embodiment, the first dividing means comprises first and second movable supports for accepting the tube between them, each of the first and second movable supports having a plurality of corresponding first dividing members thereon, adapted such that, on moving the movable supports in a certain direction, one or more first dividing members from the first movable support engages with one or more corresponding first dividing members from the second movable support to press the sides of the tube together to form the divide in the tube and draw the tube downwards, and each of first and second movable supports may, for example, comprise or be a rotatable body, e.g. a cylinder.

The first dividing means (which may comprise first and/or second dividing members, e.g. as described herein) on each rotatable body, e.g. cylinder, is preferably helically arranged around each rotatable body, e.g. cylinder. The pitch of the helix formed by each first dividing means is preferably longer than the length of the rotatable body, e.g. cylinder. In other words, each first dividing means preferably forms only a partial helix turn about the rotatable body, e.g. cylinder. In terms of degrees, the first dividing means may turn, for example, from 1 to 30°, preferably from 1 to 20°, more preferably from 1 to 10°, along the length of the rotatable body, e.g. cylinder, on which it is disposed. The 'hand' of the helix of the first dividing means on the rotatable body of the first movable support is opposite to that of the first dividing means on the rotable body of the second movable support, when viewed down the axis of each movable support from the same end of each movable support. The first and second rotatable bodies each preferably rotate on an axis, which is preferably along the horizontal. The cross-sectional shape of the rotatable body, excluding any dividing members thereon, may be any suitable shape, e.g. a shape selected from square, rectangular, pentagonal, hexagonal and circular.

The first dividing members may comprise ridges located on an outer surface of the first and/or second movable supports, or located on an outer surface of the first and/or second conveyors, as described above. The ridges may have any suitable cross-sectional shape, for example square, rectangular or semi-circular, with or without fillets, chamfers or indentations. Optionally engaging first dividing members may be of an appropriate shape to interlock, e.g. one member having a protrusion thereon and the other member having an indention for acceptance of the protrusion. At least part of each first dividing member may be elongate and linear. The first dividing members may be formed from the same material as the movable support or conveyor on which they are located. The first dividing members may be integrally formed with the movable support or conveyor on which they are located. The first and second movable supports or first and second conveyors may comprise any suitable material, preferably a flexible, resilient material, for example rubber. The first dividing members may comprise a flexible, resilient material, for example an elastomer. The elastomer may comprise, for example, a natural or synthetic rubber. The rubber may be a reinforced rubber, for example a matrix comprising rubber and a reinforcing material, such as fibres, therein. The synthetic rubber may comprise one or more of polymers formed from bromo isobutylene isoprene, polybutadiene, polymers formed from chloro isobutylene isoprene, polychloroprene, chlorosulphonated polyethylene, polymers formed from epichlorohydrin, polymers formed from ethylene propylene, polymers formed from ethylene propylene diene monomer, halogenated, e.g. fluorinated or chlorinated, hydrocarbon polymers (including, but not limited to, polyvinyl chloride or PVC), fluoro silicone, hydrogenated nitrile butadiene polymers, polyisoprene, isobutylene isoprene butyl polymers, methyl vinyl silicone, acrylonitrile butadiene polymers, polyurethane, polymers formed from styrene butadiene, styrene ethylene copolymers (sometimes termed butylene styrene), polysiloxane and polymerised acrylonitrile butadiene carboxy monomer.

In an embodiment, the first and second conveyors are driven by rollers having axes that, in use, are substantially horizontal, the first dividing members on the first and second conveyors are elongated and, when the one or more first dividing members on the first conveyor engage with the one or more corresponding first dividing members on the second conveyor forming the divide in the tube, the corresponding first dividing members on the first and second conveyor have upper surfaces that are angled downward from the horizontal, to allow liquid waste to flow downward to a liquid storage means located below the divide. This embodiment has the advantage that the conveyors can draw the tube vertically downwards, but allow the liquid waste to be directed down the slope of the upper surface of the dividing members to a liquid storage means.

Optionally, the first dividing members on the first and second movable supports (or first and second conveyors) each have a first and second portion,
wherein the first portion is elongated and when the one or more first dividing members on the first movable support (or first conveyor) engage with the one or more corresponding first dividing members on the second movable support (or second conveyor) forming the divide, each of the first portions of the first dividing members on the first and second movable supports (or first and second conveyor) has upper surfaces that are angled downward from the horizontal, said angle being in the range more than 0 to 30° from the horizontal, and each of the second portions is elongated and extend downward from the lower end of the first portion, such that corresponding second portions can engage and form a vertical divide in the tube, e.g. a vertical seal between the sides of the tube, by pressing the sides of the tube together.

The divide, e.g. a seal, formed by the engaging first portions may be temporary, such that, when the engaging first portions are moved away from one another, the divide, e.g. the seal, is unformed or released. This has the advantage of being able to contain undesirable odours within the lower part of the tube containing the waste for the period when the tube is within the toilet. The tube can then optionally be removed and permanently sealed by a user of the toilet, for disposal or otherwise.

Optionally, the first dividing members are adapted to form a permanent divide in the tube. Optionally, the first and/or second portions of the first dividing members are adapted to form a permanent divide in the tube. The permanent divide may be formed by heat sealing the sides of the tube together. This may be achieved by including a heating means in one or both of engaging first dividing members and/or one or both of engaging first and/or second portions.

Optionally, all first dividing members on the first and second conveyors include a heating means. Optionally, all first and/or second portions include a heating means.

As described above, optionally an adhesive may be present on one or more interior sides of the tube. Such adhesive may be a pressure adhesive. A permanent divide in the tube may be formed by engaging corresponding first dividing members on first and second movable supports (or first and second conveyors) to press the sides of the tube together and adhere the sides of the tube together with the adhesive.

In an embodiment, the first and second movable supports (or first and second conveyors) have a plurality of second dividing members thereon adapted to act as a valve to allow liquid waste to flow downwards to a liquid storage means, and when liquid waste is not flowing downwards to the liquid storage means, form a divide in the tube by pressing the sides of the tube together.

In an embodiment, the first and second movable supports have a plurality of second dividing members thereon, each of the second dividing members located adjacent to one of the first dividing members on the first and second movable supports such that when the first dividing member from the first movable support engages with the corresponding first dividing member from the second movable support, each of the first dividing members has an upper end and a lower end, and second dividing members are at a lower end of the adjacent first dividing members on the first and second movable supports, and the second dividing members on the first and second movable supports can, in a first position, engage to form a divide in the tube, e.g. a seal between the sides of the tube, by pressing the side of the tube together, and, in a second position, allow liquid water to flow downwards to a liquid storage means located below the divide.

In an embodiment, the first and second conveyors have a plurality of second dividing members thereon, each of the second dividing members located adjacent to one of the first dividing members on the first and second conveyors such that when the first dividing member from the first conveyor engages with the corresponding first dividing member from the second conveyor, each of the first dividing members has an upper end and a lower end, and second dividing members are at a lower end of the adjacent first dividing members on the first and second conveyors, and the second dividing members on the first and second conveyors can, in a first position, engage to form a divide in the tube, e.g. a seal between the sides of the tube, by pressing the side of the tube together, and, in a second position, allow liquid water to flow downwards to a liquid storage means located below the divide.

In an embodiment, the toilet comprises a second dividing means adapted, in use, to form a vertical divide in the tube (vertical e.g. when, in use, the bottom of the tube is located directly below the opening of the tube), preferably a permanent vertical divide, to divide the tube into a first portion and a second portion. The second dividing means, in use, preferably remains substantially stationary as the tube is drawn downwards, for example by the first dividing means. In this embodiment, preferably the first dividing means is adapted, when not drawing the tube downwards, to substantially prevent solid waste passing through the divide to the bottom of the tube, while allowing liquid waste to pass through the first dividing means to the second portion of the tube, and, when the tube is drawn downwards, any solid waste is substantially drawn down with the tube into the first portion of the tube. Preferably, in use, the toilet comprises a housing and a shelf that is located under the divide and extends part way into the interior of the housing, such that, when the tube is drawn downwards, the first portion of the tube substantially resides on the shelf and the second portion of the tube substantially resides beneath the shelf. The second dividing means may comprise a heater for heat-sealing the sides of the tube together. The second dividing means may comprise means located on opposing sides of the tube for pressing the sides of the tube together. If the tube contains a pressure adhesive on one or more interior sides of the tube, the second dividing means may press the sides of the tube together to seal them with the pressure adhesive.

If more than one conveyor is located on and driven by the same rollers, as described below, the second dividing means is preferably located between two of the conveyors.

In an embodiment A, the first dividing means comprises first and second conveyors as described above and further comprises movable third and fourth conveyors, each of third and fourth conveyors having a plurality of second dividing members thereon adapted to act as a valve to allow liquid waste to flow downwards to the liquid storage means, and when liquid waste is not flowing downwards to the liquid storage means, form a divide in the tube (e.g. a seal between the sides of the tube) by pressing the sides of the tube together.

In an embodiment A, the first dividing means comprises first and second conveyors as described above and further comprises movable third and fourth conveyors, each of third and fourth conveyors having a plurality of second dividing members thereon, each of the second dividing members located adjacent to one of the first dividing members on the first and second conveyors such that when the first dividing member from the first conveyor engages with the corresponding first dividing member from the second conveyor, each of the second dividing members are at a lower end of the upper surface of the adjacent first dividing members on the first and second conveyors, and the second dividing members on the third and fourth conveyors can, in a first position, engage to form a divide in the tube by pressing the side of the tube together, and, in a second position, allow liquid water to flow downwards to a liquid storage means located below the divide.

In embodiment A, the third conveyor is preferably located adjacent the first conveyor, optionally on the same rollers as the first conveyor, and the fourth conveyor is preferably located adjacent the second conveyor, optionally on the same rollers as the second conveyor. The first and third conveyors preferably move in a corresponding manner, such that the conveyors move at the same speed and a movement of the first conveyor and dividing members thereon results in an equivalent movement of the third conveyor and dividing members thereon. The second and fourth conveyor preferably move in a corresponding manner, such that the conveyors move at the same speed and a movement of second conveyor and dividing members thereon results in an equivalent motion of the fourth conveyor and dividing members thereon.

In embodiment A, the first and second conveyors may be driven by rollers that are preferably cylindrical. Each of first and second conveyors may be driven by two rollers. If the third and fourth conveyors are present, the third conveyor is preferably located on the same rollers as the first conveyor and the fourth conveyor is preferably located on the same rollers as the second conveyor. This allows the first, second and fourth conveyors to move in a corresponding manner, such that the conveyors move at the same speed.

In embodiment B, the first dividing means comprises first and second conveyors, and a third conveyor is located on and driven by the same rollers as the second conveyor. The second conveyor has a plurality of first dividing members thereon that engage with first dividing members of the first conveyor. The first dividing members are preferably as described herein. The first and third conveyors preferably have a plurality of second dividing members thereon adapted to act as a valve to allow liquid waste to flow downwards to the liquid storage means, and when liquid waste is not flowing downwards to the liquid storage means, form a divide in the tube, e.g. a seal between the sides of the tube, by pressing the sides of the tube together. A second dividing means, as described herein, may be located between first and third conveyors. The first and second dividing members and the second dividing means may act together to form a divide in the tube, e.g. a seal between the sides of the tube, across the width of the tube, such that the tube has an upper portion and one or more lower portions. This divide in the tube, e.g. a seal between the sides of the tube, preferably prevents odour from escaping from the one or more lower portions of the tube.

In embodiment B, the second dividing means may comprise a stationary support and a body extending from the stationary support toward the first conveyor. The body may engage with one or more dividing members located on the first conveyor, such that the second dividing means and the one or more dividing members on the first conveyor press the sides of the tube together to form a vertical divide in the tube, e.g. a seal between the sides of the tube. The second dividing means preferably remains substantially stationary as the conveyors move.

In embodiment B, the one or more dividing members on the first conveyor may comprise a dividing member, for example in the form of a ridge, which may extend around the circumference of the first conveyor. The second dividing means may form a permanent vertical divide in the tube, e.g. a vertical seal between the sides of the tube. The second dividing means may comprise a heater for heat sealing the sides of the tube together. The heater may be located on the body, which is located on a stationary support. The stationary support may have a cross sectional shape substantially corresponding to the shape of the second conveyor when located on the rollers (excluding the dividing members located on the second conveyor). The body may extend from the stationary support substantially the same distance as the first dividing members extend from the second conveyor.

In an embodiment, the first dividing means comprises first and second conveyors as described above and further comprises a movable third conveyor, the third conveyor having a plurality of second dividing members thereon. In an embodiment, a third conveyor is located and driven by the same rollers as the second conveyor. Each of the second dividing members on the third conveyor may, in use, be located adjacent to one of the first dividing members on the second conveyor such that when the first dividing member from the first conveyor engages with the corresponding first dividing member from the second conveyor, each of the first dividing members has an upper end and a lower end and each of the second dividing members are at the lower end of the first dividing members on the first and second conveyors, and the second dividing members on the first and third conveyors can, in a first position, engage to form a divide in the tube, e.g. a seal between the sides of the tube, by pressing the side of the tube together, and, in a second position, allow liquid water to flow downwards to a liquid storage means located below the divide.

The third conveyor may be located adjacent the second conveyor. The second and third conveyors preferably move in a corresponding manner, such that the conveyors travel at the same speed and a movement of the second conveyor and dividing members thereon results in an equivalent movement of the third conveyor and dividing members thereon.

The first and second conveyors may be driven by rollers that are preferably cylindrical. Each of first and second conveyors may be driven by two rollers. In an embodiment, the third conveyor may preferably located on the same rollers as the second conveyor. This allows the second and third conveyors to move in a corresponding manner, such that the conveyors move at the same speed.

In an embodiment, the second dividing members are biased toward the first position. The second dividing members may comprise ridges located on the surface of the first, second, third and/or fourth conveyors, as described above. The ridges may have any suitable cross-sectional shape, for example square, rectangular or semi-circular, with or without fillets, chamfers or indentations. Optionally engaging second dividing members may be of an appropriate shape to interlock, e.g. one member having a protrusion thereon and the other member having an indention for acceptance of the protrusion. The second dividing members may be formed from the same material as the movable support, or conveyor, on which they are located. The second dividing members may be integrally formed with the movable support or conveyor on which they are located. The second dividing members may be formed from a resilient porous material, preferably a foamed material. The second dividing members are preferably more compressible, i.e. compressible with less force per surface area, than the first dividing members.

Each of the second dividing members may comprise a flap having a hinge, which, when a second dividing member on one movable support (or conveyor) engages with a corresponding second dividing member on an opposing movable support (or conveyor), is located at the top of the flap. The second dividing members can be biased toward the first position by any suitable means, for example by means of a biasing member, e.g. a spring member, located behind or at the bottom of the flap, the spring being connected to the conveyor on which the flap is located. The biasing member may be of any suitable shape and comprise any suitable material. The biasing member may be integrally formed with the flap and/or the conveyor. In an embodiment, the second dividing member may comprise a membrane of resilient material affixed at two places to the surface of the conveyor, such that the membrane between the two places extends outwardly from conveyor. A cavity is preferably formed between the surface of the conveyor and the membrane. The membrane, when affixed to the conveyor, may form a compressible member. In an embodiment, the second dividing members are formed from a resilient membrane running around the circumference of the conveyor, the membrane affixed to the surface of the conveyor at a plurality of places, with portions of the membrane extending outwardly from the conveyor between each place that the membrane is affixed to the conveyor. This may be termed a pillow belt.

Figure 6B:
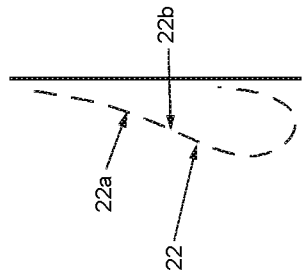
FIGS. 6A to 8 illustrate further different embodiments of the conveyors.

In an embodiment, a or each second dividing member may be formed from a sheet of resilient material having first and second opposing faces, and connected to the surface on which the first dividing member is disposed, e.g. a surface of a movable support or conveyor, at each end of the sheet, with the first surface of one end of the sheet being affixed to the surface on which the second dividing member is disposed and the second surface of the other end of the sheet being affixed to the surface on which the second dividing member is disposed. This forms an effective tear drop shape and gives directionality to the second dividing members—an illustration of an embodiment of this type of second dividing member can be seen in the cross sectional view of a portion of the belt in FIG. 6B. Preferably, in use, if the first surface of corresponding sheets are disposed closer to one another than the second surfaces of the corresponding sheets, when the sheets engage, the upper end of the sheets are affixed to the surface on which they are disposed (e.g. of a movable support or conveyor) by the second surface.

Preferably the first and second dividing members are located sufficiently close to one another on the same movable support, or conveyor (e.g. the first conveyor) or adjacent conveyors (e.g. first and third conveyors), such that when engaging with corresponding first and second dividing members on the other movable support, or conveyor (e.g. the second conveyor) or conveyors (e.g. second and third conveyors), the engaging first and second dividing members act together to form the divide in the tube, e.g a seal between the sides of the tube, which may be a permanent seal, as described above. This divide preferably extends across at least part of the width of the tube, to divide the tube into an upper portion located above the divide and a lower portion located below the divide. The divide preferably extends across the entire width of the tube to completely divide the lower portion of the tube from the upper portion of the tube.

Non-limiting embodiments of the present invention will now be illustrated with reference to the Figures, which were described briefly above.

Figure 2:
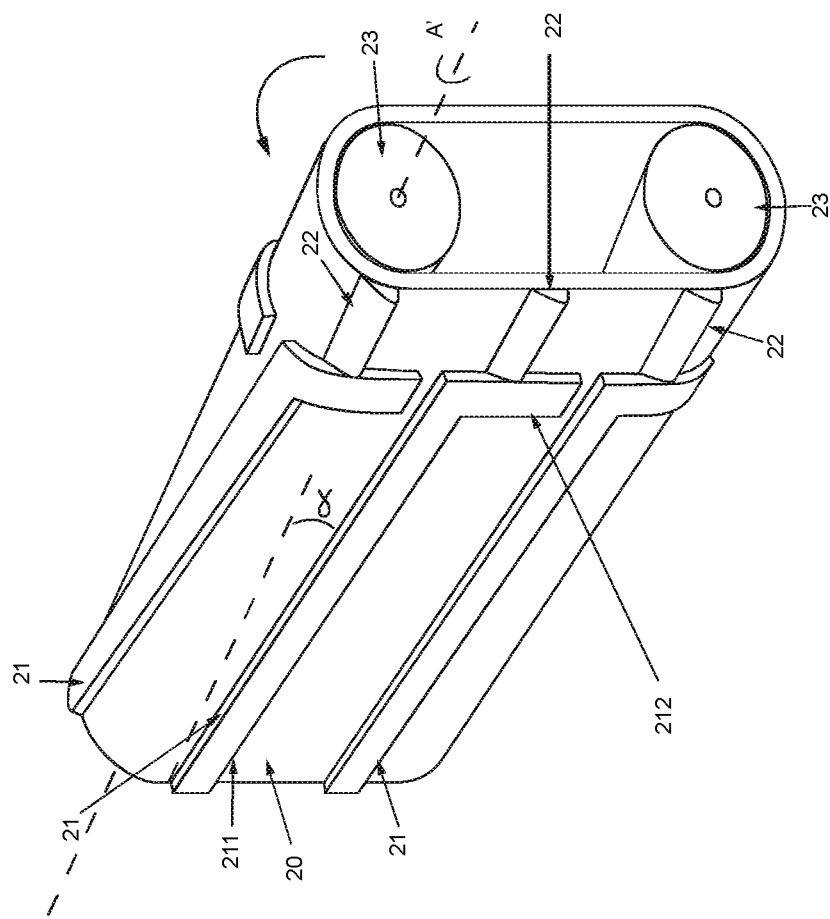
FIG. 2 shows an embodiment of one part of the dividing means of the present invention.

FIG. 1 shows an embodiment of the toilet of the present invention. FIG. 2 shows a part of an embodiment having a first dividing means (13) in the form of a conveyor (20) having first and second dividing members (21) and (22), respectively, thereon. FIG. 3 shows a cross sectional view of the conveyors of FIG. 1. The engaging conveyors (20), which are in the form of belts, have dividing members. The tube has an opening (32) for accepting liquid and solid waste. Various versions of the conveyor are illustrated in the Figures.

In FIG. 1 the toilet has a housing (10) that, in use, is orientated so that its aperture (110) is located on a top part of the housing. A flexible tube (12) is located within the housing, the tube having an opening (32) corresponding to the aperture of the housing. Waste that is passed through the aperture (110) of the housing falls into the opening (32) of the tube. The housing has a seat (112) of a shape comfortable for a user of the toilet to sit upon. The seat may form a complete ring or a partial ring that defines an aperture. In an embodiment, the toilet may have wheels located on the exterior of the toilet to allow easy transportation of the toilet. In the embodiment shown in FIG. 1, the toilet has two wheels (113) located at the base and toward the back of the housing (only one wheel of the two wheels shown in the Figure). A handle may be disposed on the outer part of the toilet for easy transportation.

The dispensing means comprises the tube (12) that has sides (31), the upper portion of which are folded in a concertina manner in an annular fashion around the opening of the tube (folding not shown in the Figures), allowing easy unfolding of the tube, such that it can be drawn downwards towards and through the first dividing means (13). The folded parts of the upper part of the tube are stored in an annular portion (18) of the housing located below the aperture, e.g. on a shelf or within a cartridge (not shown in the Figures). A guide portion (19) in the form of a flap extending outwardly from annular portion 18 is provided to ensure that at least some of the tube contacts the second dividing members on the conveyors, as described below.

The embodiment shown in FIG. 1 has two pairs of rollers (23), with a conveyor (20) or conveyors (20) located on each pair of rollers. Each conveyor is in the form of a belt. Cogs (114) are located on one end of adjacent rollers. The cogs cooperate to allow the opposing conveyors to be driven at the same speed, such that the engagement means on opposing conveyors engage as required and do not fall out of alignment with one another. The conveyors may be driven by any mechanical means, for example by a handle located on the axis of one of the conveyors, such that the rotation of the handle by hand can rotate the rollers and drive the conveyors. At least part of the handle may be located on an exterior of the housing, as shown in FIG. 1. The rotation of the rollers may be driven by a motor, operated as desired by the user of the toilet. All conveyors shown in the Figures are in the form of belts.

A number of embodiments of the conveyors are illustrated in the Figures.

Figure 5:
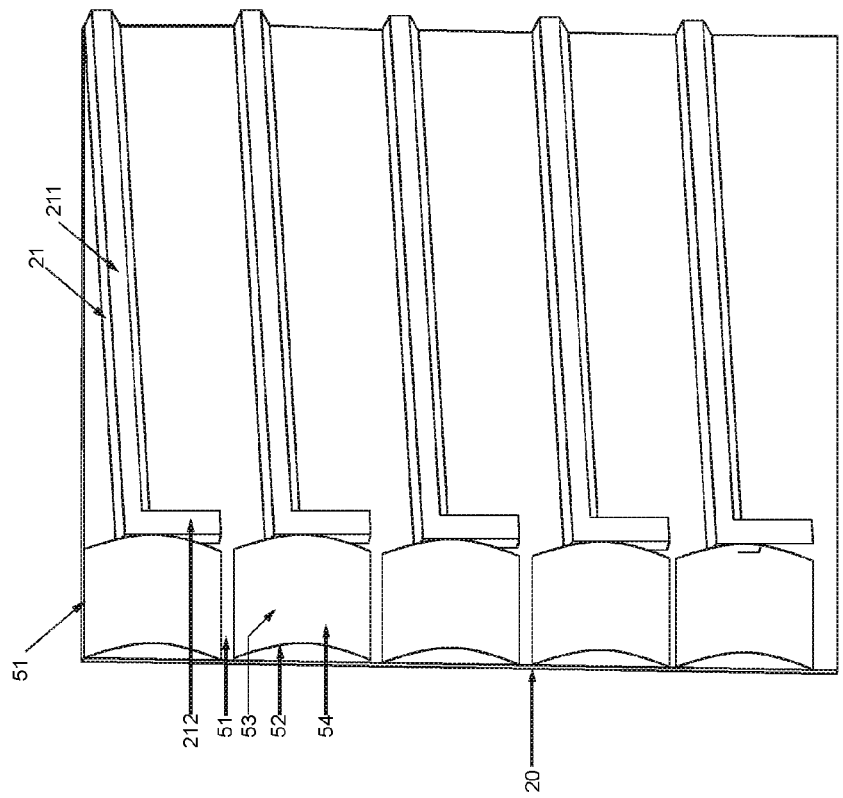
FIG. 5 shows a further example of the dividing means of the present invention.

The embodiment of the conveyors shown in FIGS. 1, 3 and 5 will now be described. The embodiment of FIG. 1 has three conveyors (20). In operation, the conveyors engage as shown in FIG. 1, such that corresponding first and second dividing members from opposing conveyors engage to press together the sides of a tube disposed between the conveyor, to form a divide in the tube, e.g. a seal between the sides of the tube. First and second dividing members are located on a first conveyor (shown as the left hand conveyor in FIG. 1) having first and second dividing members, (21) and (22), respectively. A portion of the first conveyor is shown in FIG. 5. The first conveyor is driven by rollers (23). The first dividing members are as described below and shown in FIG. 2, except that, instead of the second portion of the first members, a ridge extends around the circumference of the conveyor connecting with each first portion of the first dividing members. Two rollers (23) rotating on horizontal axes drive the first conveyor. The first conveyor engages with a second conveyor and a third conveyor. The first conveyor has first dividing members that form ridges across the outer surface of the conveyor. Each first dividing member is elongated, linear and extends across the width of the conveyor. Each first dividing member has a rectangular cross sectional shape. In use, the first dividing members on the left hand conveyor would engage with corresponding first dividing members on the opposing right hand conveyor (the second conveyor, as described below). When corresponding first dividing members on opposing conveyors are engaged, the upper surface of each engaging first portion is angled downward from the horizontal, said angle typically being in the range of more than 0 to 30°.

The first conveyor in FIG. 1 engages with two opposing conveyors, a second conveyor and a third conveyor. The second conveyor has first dividing members (21) that form ridges across the outer surface of the conveyor. Each first dividing member is elongated, linear and extends across the width of the conveyor. Each first dividing member has a rectangular cross sectional shape. They engage with the first dividing members on the opposing conveyor as described above.

The first conveyor in FIG. 1 also engages with a third conveyor, which is located on and driven by the same rollers that drive the second conveyor. Each of first and third conveyors has a plurality of second dividing members (22) thereon adapted to act as a valve to allow liquid waste to flow downwards to the liquid storage means, and when liquid waste is not flowing downwards to the liquid storage means, form a divide in the tube, e.g. a seal, by pressing the sides of the tube together. Each second dividing member (22) shown on the first conveyor in FIG. 1 has a corresponding second dividing member on the third conveyor. The corresponding second dividing members on the conveyors can, in a first position, engage to form a divide in the tube (e.g. a seal) by pressing the sides of the tube together, and, in a second position, allow liquid water to flow downwards to a liquid storage means located below the divide.

In FIG. 1, a second dividing means (17) is located between the second and third conveyors. The second dividing means is located between second and third conveyors. The second dividing means forms a vertical divide in the tube, e.g. a vertical seal between the sides of the tube, as it is drawn downward. The second dividing means is illustrated in more detail in FIG. 4. The second dividing means in FIG. 1 comprises a heater located on a body (not shown). The body extends from a stationary support. The body and heater remain substantially stationary as the conveyors are moved. The stationary support has a cross sectional shape substantially corresponding to the shape of the conveyors on the rollers (excluding the dividing members located thereon). The body extends from the stationary support substantially the same distance as the first dividing members extend from the second conveyor. The body and the heater engage with a ridge extending around the circumference of the first conveyor, such that, as the tube is drawn downward the engaging ridge, body and heater form a vertical divide in the tube. When operated, the heater can form a permanent vertical seal in the tube, as it heat-seals the opposing sides of the tube together.

Each of the second dividing members in FIG. 1 is biased toward the first position, as described above. The second dividing member may be in the form of flaps extending outwardly from the surface of the conveyor. Each flap may have a hinge located at the top of the flap (when the second dividing member engages with a corresponding second dividing member on an opposing conveyor). The lower part of the second dividing member (52) connects the flap (53) with the conveyor. In an embodiment, the upper part of the second dividing member forming the flap (53) and the lower part of the second dividing member (54) are integrally formed. In this embodiment, preferably the upper and lower parts of the second dividing member are formed from a resilient material. In an embodiment and as shown in FIG. 1, the second dividing members are formed from a single resilient membrane running around the circumference of the conveyor, the membrane affixed to the surface of the conveyor at a plurality of places, with portions of the membrane extending outwardly from the conveyor between each place that the membrane is affixed to the conveyor. If the conveyor has a plurality of first dividing members thereon, each having first and second portions as described above, and the resilient membrane thereon, preferably the resilient membrane extends outwardly from the conveyor in locations adjacent to the second portions of the first dividing members.

The embodiment in FIG. 2 will now be described. In this embodiment, the first dividing means comprises two conveyors (20). Each of the conveyors (20) is driven by two rollers (23) around an axis A', which is along the horizontal. Each of the conveyors is in the form of a belt. One of the conveyors (20) is shown in FIG. 2. The conveyor has a plurality of first dividing members (21) that form ridges across the outer surface of the conveyor. Each first dividing member has a first portion (211) and a second portion (212). Each first portion is elongated, linear and extends part way across the width of the conveyor, which is in the form of a belt. Each first portion has a rectangular cross sectional shape. In use, the first portions on the side of the conveyor shown in FIG. 2 would engage with corresponding first portions on the other of the two conveyors (20). When corresponding first portions are engaged, the upper surface of each engaging first portion is angled downward from the horizontal, said angle ($\alpha$) typically being in the range of more than 0 to 30°. Each of the second portions is elongated, linear and, when the corresponding first portions on the two conveyors are engaged, extend downward from the lower end of the first portion. Accordingly, each second portion on one conveyor will engage with a second portion of the other conveyor, such that the engaging second portions act to form a vertical divide by pressing the sides of the tube together. The second portion extends downward, but a gap remains between the lower part of the second portion and the upper surface of the first dividing member below. In use, the axis A' of the conveyors is parallel to the line that runs from the front to the back of the toilet. The front and back of the toilet may be determined by the shape of the seat. The first dividing members are located toward the back of the toilet, relative to the second dividing members, which will be described below.

The conveyors (20) have a plurality of second dividing members (22) thereon adapted to act as a valve to allow liquid waste to flow downwards to the liquid storage means, and when liquid waste is not flowing downwards to the liquid storage means, form a divide in the tube, e.g. a seal between the sides of the tube, by pressing the sides of the tube together. Each second dividing member (22) shown on the conveyor in FIG. 2 would have a corresponding second dividing member on the other conveyor. The corresponding second dividing members on the conveyors can, in a first position, engage to form a divide in the tube, e.g. a seal in the tube, by pressing the sides of the tube together, and, in a second position, allow liquid water to flow downwards to a liquid storage means located below the divide. In this embodiment, each of the second dividing members is located adjacent to one of the first dividing members on the first and second conveyors such that when the first dividing member from the first conveyor engages with the corresponding first dividing member from the second conveyor, each of the second dividing members are at a lower end of the upper surface of the adjacent first dividing members on the first and second conveyors.

Each of the second dividing members is biased toward the first position, as described above. It can be seen that the second dividing members comprise a flap having a hinge, which, when the second dividing member engages with a corresponding second dividing member on the other conveyor, is located at the top of the flap. In the embodiment shown in FIG. 2, the second dividing members can be biased toward the first position by means of a biasing member, e.g. a spring or other resilient member, located at the bottom the flap and connected to the conveyor.

In the embodiment shown in the Figures, a second dividing means (17) may be provided which, in use, forms a permanent vertical divide (111) in the tube (e.g. a permanent vertical seal between the sides of the tube) as it is drawn downwards, to divide the tube into a first portion (14) and a second portion (15). The second dividing means may be located, for example, below first and second conveyors, substantially in line with the second portion of the first dividing members (if second portions are present, for example as shown in FIG. 2). As the tube is drawn downwards past the means (17), the vertical divide in the tube is formed. A divide, e.g. a seal, is formed across the first portion of the tube by engaging first dividing members. A divide, e.g. a seal, is formed across the second portion of the tube by engaging second dividing members.

Figure 4:
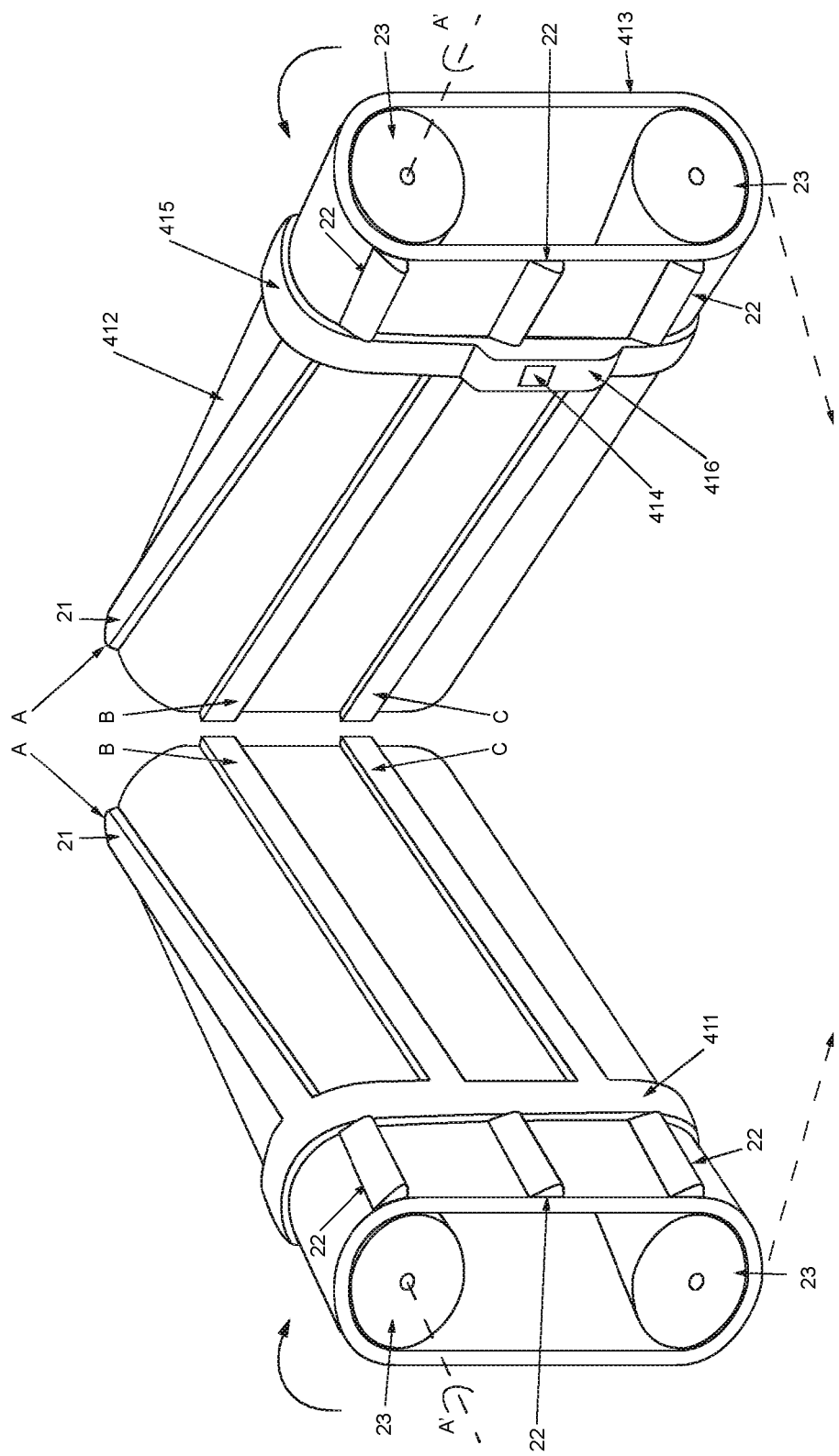
FIG. 4 shows in detail an embodiment of the the dividing means with the two conveyor parts opened apart to reveal more of the structure.

FIG. 4 shows in more detail the conveyors similar to those of the embodiment in FIG. 1, except that the second dividing members are in a different form in each of these Figures. The embodiment of FIG. 4 has three conveyors. Simply for clarity, the conveyors are shown separated. In operation, however, the conveyors would engage as shown in FIGS. 1 and 3, such that corresponding first and second dividing members from opposing conveyors engage to press together the sides of a tube disposed between the conveyor, to form a divide in the tube, e.g. a seal between the sides of the tube. First and second dividing members are located on a first conveyor (410) having first and second dividing members, (21) and (22), respectively. The first conveyor is driven by rollers (23). The first dividing members are as described above and shown in FIG. 2, except that, instead of the second portion of the first members, a ridge (411) extends around the circumference of the conveyor connecting with each of the first portion of the first dividing members. Two rollers (23) rotating on horizontal axes drive the first conveyor. The first conveyor (410) engages with a second conveyor (412) and a third conveyor (413). The first conveyor (410) has first dividing members (21) that form ridges across the outer surface of the conveyor. Each first dividing member is elongated, linear and extends across the width of the conveyor. Each first dividing member has a rectangular cross sectional shape. In use, the first dividing members on the left hand conveyor would engage with corresponding first dividing members on the opposing right hand conveyor (the second conveyor (412), as described below). When corresponding first dividing members on opposing conveyors (410 and 412) are engaged, the upper surface of each engaging first portion is angled downward from the horizontal, said angle typically being in the range of more than 0 to 30°.

The first conveyor (410) in FIG. 4 engages with two opposing conveyors, a second conveyor (412) and a third conveyor (413). The second conveyor has first dividing members (21) that form ridges across the outer surface of the conveyor. Each first dividing member is elongated, linear and extends across the width of the conveyor. Each first dividing member has a rectangular cross sectional shape. They engage with the first dividing members on the opposing conveyor (411) as described above.

The first conveyor (410) in FIG. 4 also engages with a third conveyor (413), which is located on and driven by the same rollers that drive the second conveyor (412). Each of first and third conveyors has a plurality of second dividing members (22) thereon adapted to act as a valve to allow liquid waste to flow downwards to the liquid storage means, and when liquid waste is not flowing downwards to the liquid storage means, form a divide in the tube, e.g. a seal between the sides of the tube, by pressing the sides of the tube together. Each second dividing member (22) shown on the first conveyor (410) in FIG. 4 would have a corresponding second dividing member on the third conveyor (413). The corresponding second dividing members on the conveyors can, in a first position, engage to form a divide in the tube (e.g. a seal between the sides of the tube) by pressing the sides of the tube together, and, in a second position, allow liquid water to flow downwards to a liquid storage means located below the divide.

Each of the second dividing members in FIG. 4 is biased toward the first position, as described above. It can be seen that the second dividing members comprise a flap having a hinge, which, when the second dividing member engages with a corresponding second dividing member on the opposing conveyor, is located at the top of the flap. In the embodiment shown in FIGS. 1 and 4, the second dividing members can be biased toward the first position by means of a spring or other resilient member located at the bottom the flap and connected to the conveyor.

In the embodiment shown in FIG. 4, a second dividing means (414, 416) is shown. The second dividing means is located between second and third conveyors (412 and 413, respectively). The second dividing means forms a vertical divide, e.g. a vertical seal, in the tube as it is drawn downward. The second dividing means comprises a heater (414) located on a body (416). The body (416) extends from a stationary support (415). The body and heater remain substantially stationary as the conveyors are moved. The stationary support 416 has a cross sectional shape substantially corresponding to the shape of the conveyors on the rollers (excluding the dividing members located thereon). The body extends from the stationary support substantially the same distance as the first dividing members extend from the second conveyor (412). The body (416) and the heater (414) engage with the ridge (411) extending around the circumference of the first conveyor, such that, as the tube is drawn downward the engaging ridge (411), body (416) and heater (415) form a vertical divide in the tube. When operated, the heater can form a permanent vertical seal in the tube, as it heat-seals the opposing sides of the tube together.

FIG. 5 illustrates a portion of the first conveyor similar to that of FIG. 1, except that the first dividing members are as described above for FIG. 2. The second dividing member (52) is in the form of flaps (53) extending outwardly from the surface of the conveyor. Each flap has a hinge (51) located at the top of the flap (when the second dividing member engages with a corresponding second dividing member on an opposing conveyor). The lower part (54) of the second dividing member (52) connects the flap (53) with the conveyor. In an embodiment, the upper part of the second dividing member forming the flap (53) and the lower part of the second dividing member (54) are integrally formed. Each second dividing member may be considered to be a membrane of resilient material affixed at two places to the surface of the conveyor, such that the membrane between the two places extends outwardly from conveyor. In this embodiment, preferably the upper and lower parts of the second dividing member are formed from a resilient material. In an embodiment, the second dividing members are formed from a single resilient membrane running around the circumference of the conveyor, the membrane affixed to the surface of the conveyor at a plurality of places, with portions of the membrane extending outwardly from the conveyor between each place that the membrane is affixed to the conveyor. If the conveyor has a plurality of first dividing members thereon, each having first and second portions as described above, and the resilient membrane thereon, preferably the resilient membrane extends outwardly from the conveyor in locations adjacent to the second portions of the first dividing members. This is illustrated in FIG. 5.

As shown in FIG. 1, the housing has a shelf (16) located below the conveyors. The shelf (16) extends part way into the interior of the housing and is arranged such that as the tube (12) is drawn downwards, at least some of the first portion (14) of the tube resides on the shelf, while at least some of the second portion (15) of the tube resides under the shelf on the base of the housing.

The operation of the above embodiments of the toilet will now be described. This applies to all embodiments described above and illustrated in the Figures. It will be assumed that the toilet comprises the tube as described above, and the bottom of the tube has been drawn down from the annular portion (18) to a position below the dividing means (13). A permanent vertical divide (111) in the tube is formed by a second dividing means (e.g. as shown in FIG. 4 or located below the rollers in line with second portion of the first dividing members of the embodiment of FIG. 2), such that the part of the tube below the dividing means 13 has a first portion (14) and a second portion (15) as described above.

The conveyors are in a resting position. When liquid waste, such as urine, is deposited within the toilet through the aperture it falls into the opening of the tube. Liquid waste that falls on part of the tube located above the first dividing members flows downward toward a lower part of the first dividing members. The liquid then flows onto a part of the tube located above the engaging second dividing members. The weight of the liquid is such that the engaging second dividing members are forced apart to a sufficient extent to allow the liquid to flow down past the second dividing members to the second portion of the tube located below. When the liquid has flowed past the second dividing members, they move back to their engaging positions. The first and second dividing members, and the second dividing means, if present, act together to form a divide in the tube, e.g. a seal between the sides of the tube, across the entire width of the tube to prevent odours from escaping from the first and second portions of the tube.

When solid waste, such as faeces, is deposited within the toilet through the aperture, it falls into the opening of the tube. Solid waste that falls on part of the tube located above the first dividing members typically does not flow and instead substantially stays in position. When the rollers are turned to drive the conveyors in an appropriate direction, the solid waste is drawn downwards with the tube. The solid waste passes between the conveyors substantially in the space between upper and lower first dividing members, and then falls into the first portion of the tube.

Accordingly, it can be seen that the embodiment of the present invention described above is able to separate solid and liquid waste. Due to the sealing action of the first and second dividing members, odour from waste in the first and second portions of the lower part of the tube is substantially prevented from escaping. Unlike in the prior art, the tube need only be drawn downwards to seal odour when solid waste is deposited. This reduces the amount of packaging required to contain the waste. Additionally, a single action of turning the conveyors can move waste downwards into the tube while still forming a seal between opposite sides of the tube.

Figure 6A:
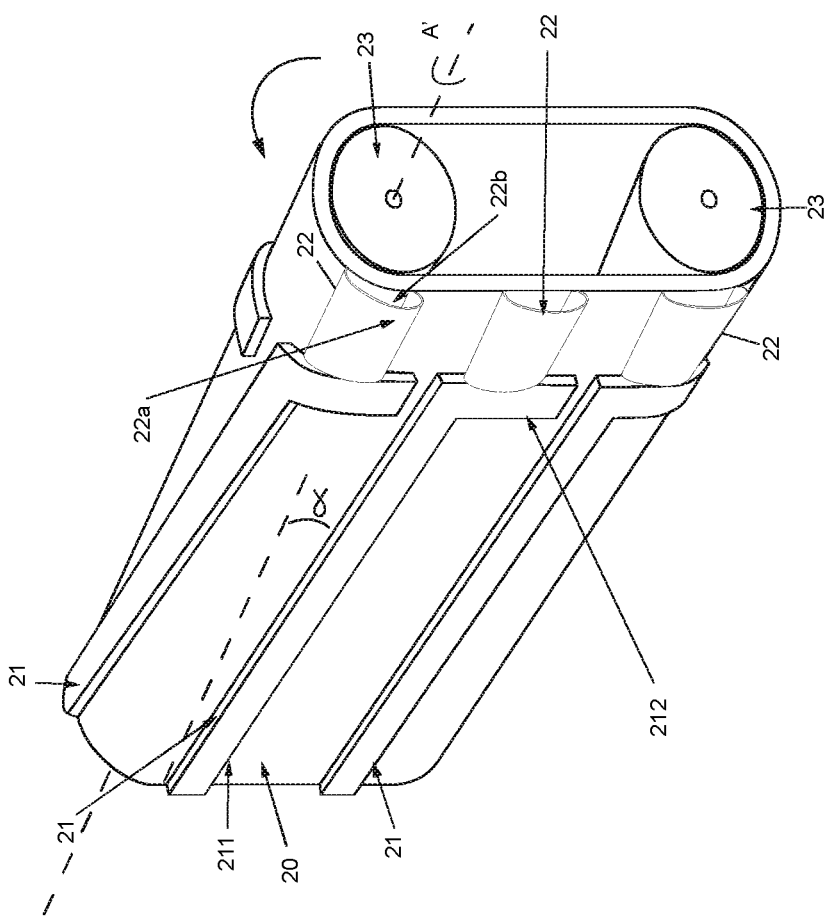

Some alternative embodiments will now be described. FIG. 6A illustrates conveyors similar to those of FIG. 2, except that the second dividing means are in a different form. In FIG. 6A, the second dividing members are in the form of sheets of resilient material. Each sheet is connected to the belt at two places, an upper part and a lower part. Each sheet has first (22*a*) and second opposing faces (22*b*). The second face (22*b*) of the upper part of the sheet is affixed to the belt, and the first face (22*a*) of the lower part of the sheet is affixed to the belt. This forms an effective tear drop shape and gives directionality to the second dividing members, as can be seen in the cross sectional view of a portion of the belt in FIG. 6B. In use, the first faces (22*a*) of engaging second dividing members would face one another and grip the tube.

Figure 7B:
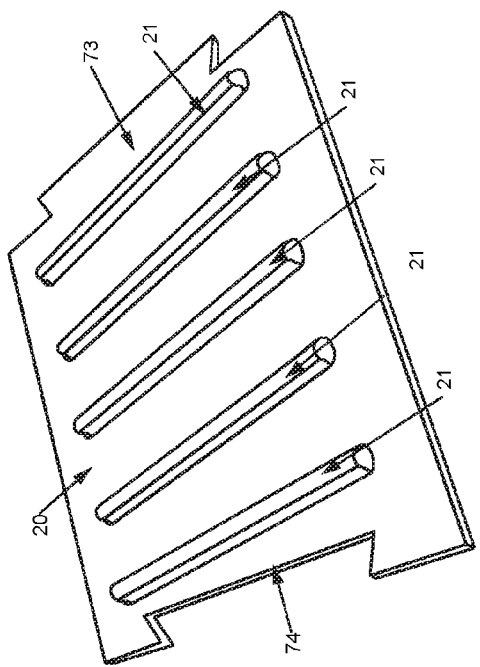
Figure 7A:
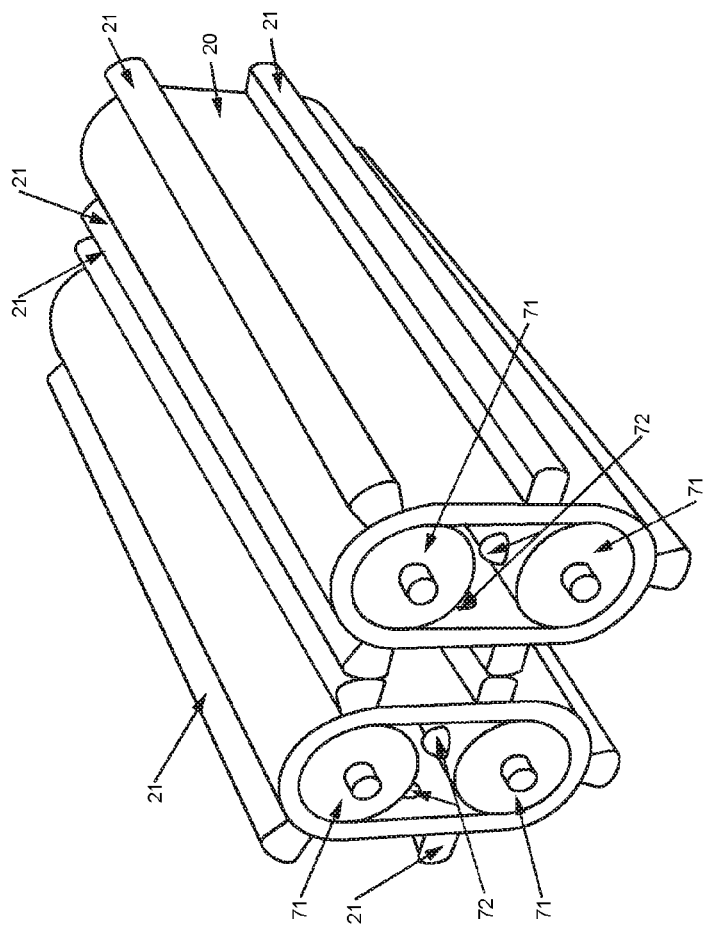

FIG. 7A illustrates a further embodiment of the conveyors. These conveyors (20) are in the form of a belt having first dividing members (21) thereon. In this embodiment, the first dividing members are integrally formed with the belt. They extend across the entire width of the belt. As in other embodiments described herein, in use, the dividing members would be angled away from the horizontal. Each belt is located upon and driven by sprocket wheels (71) having teeth (72) thereon. The axis on which the sprocket wheels turn is along the horizontal. The teeth of the sprocket wheel engage with corresponding apertures in the belt (apertures not shown in figure). An unfolded version of the belt (21) of FIG. 7A is illustrated in FIG. 7B. As can be seen, the unfolded belt has engaging portions (73, 74) at each end which engage when the belt is folded into a loop. Engaging portion 73 is in the form of a protrusion and engaging portion 74 is in the form of an indentation of corresponding shape to engaging portion 73.

Figure 8:
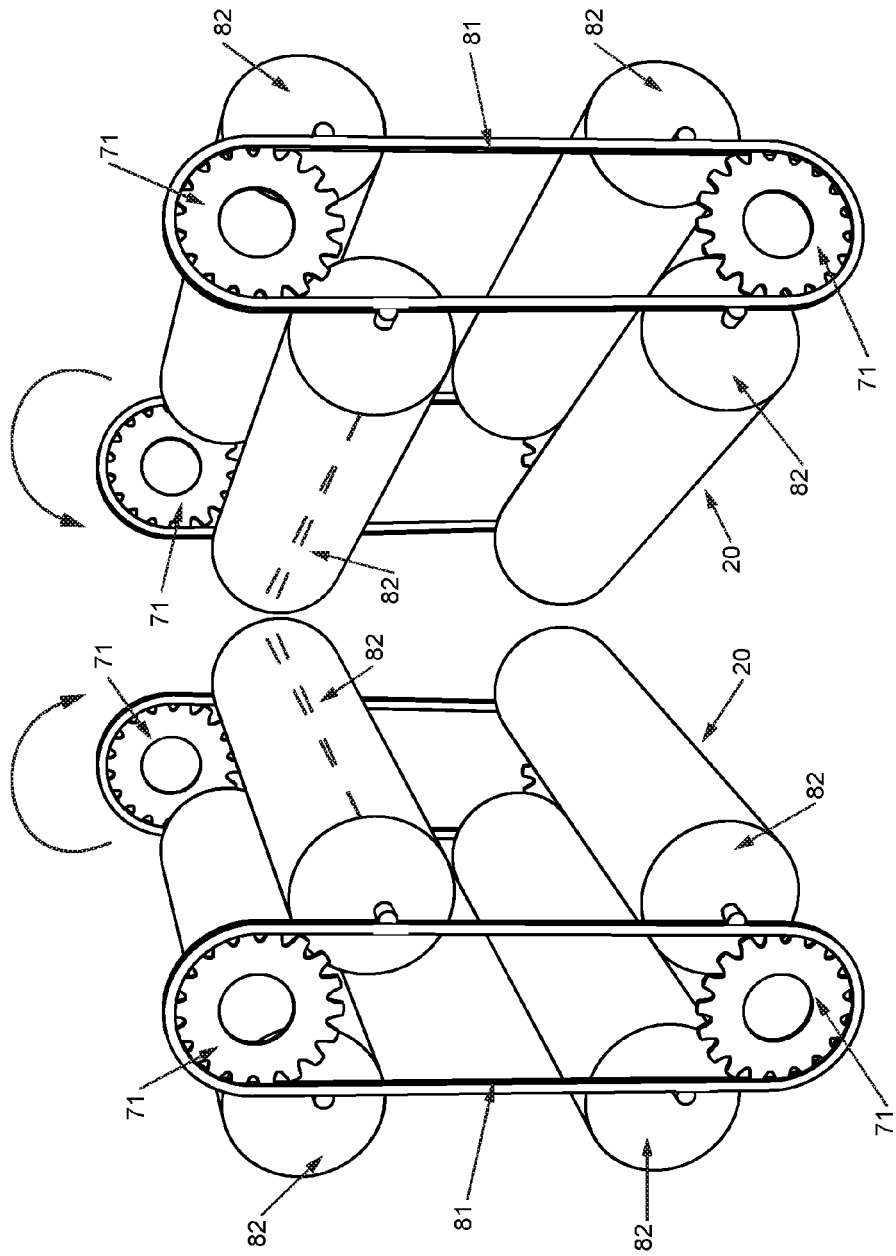

FIG. 8 illustrates a further embodiment of the conveyors. In this embodiment, the conveyors comprise dividing members in the form of a cylinder (82), although any other suitable shaped member could be used, and chains (81). The cylinders (82) are attached to the chains (81). Each chain (81) runs on two sprocket wheels (71). The axis on which the sprocket wheels turn is along the horizontal. The axis of the cylinders is angled away from the horizontal.

Figure 9A:
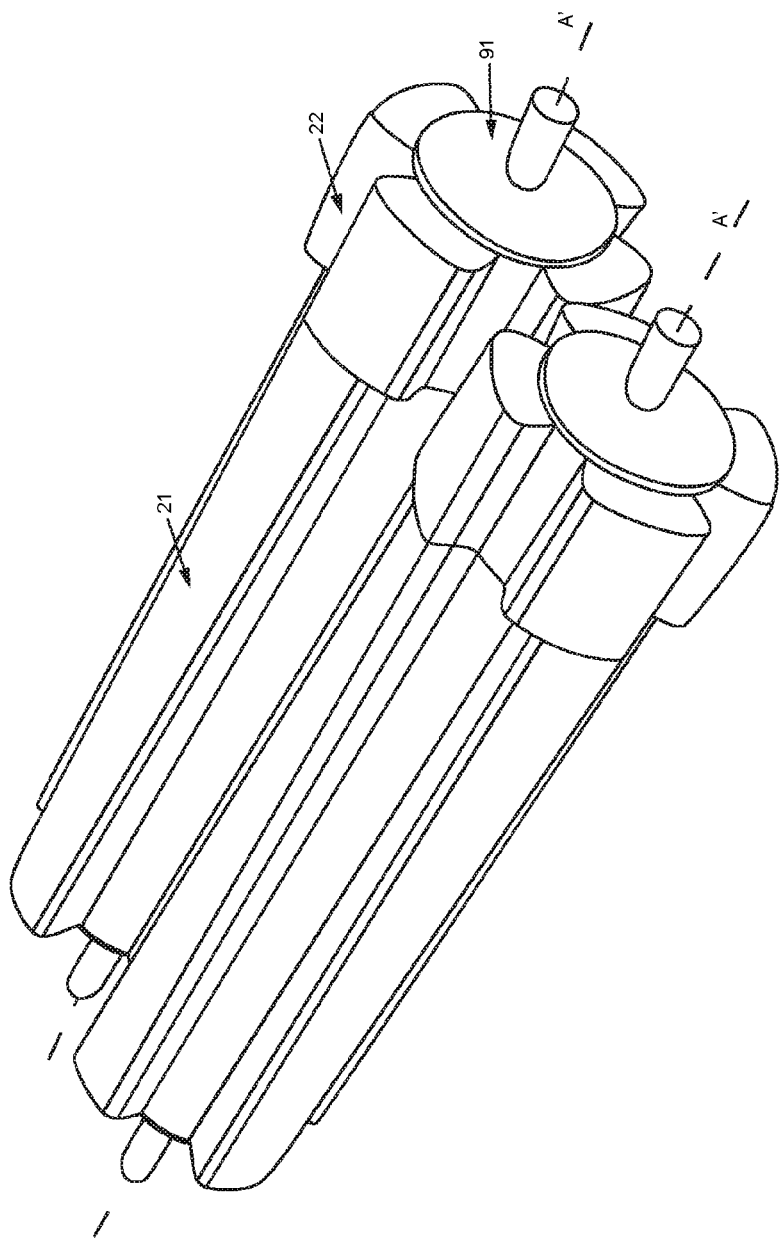
FIGS. 9A and 9B illustrate an embodiment having first and second dividing members on rotating cylinders.
Figure 9B:
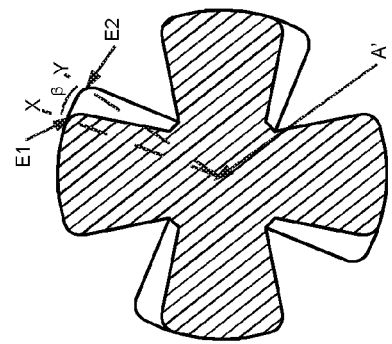

FIG. 9A illustrates an embodiment having movable supports (91) having first (21) and second (22) dividing members thereon. In this embodiment, the movable supports (91) are in the form of a rotatable body, more specifically a cylinder. Each cylinder rotates on an axis A', which is along the horizontal. The first dividing members (21) form ridges across the outer surface of the cylinders, running approximately along the length of the cylinder. More specifically, the first dividing members (21) are helically arranged around each cylinder. The pitch of the helix formed by each first dividing member is longer than the length of the cylinder (91). In other words, each first dividing means forms only a partial helix turn about the cylinder (91). In terms of degrees, the first dividing means may turn, for example, from 1 to 30° (around the circumference of the cylinder) along the length of the cylinder on which it is disposed—this is illustrated in FIG. 9B by the angle β between (i) the line X formed by the axis A' and the foremost right-hand edge (E1) of one first dividing member and (ii) the line Y formed by the axis A' the furthest right-hand edge (E2) of the same first dividing member, i.e. angle β may be from 1 to 30°. The 'hand' of the helix of the first dividing members on one cylinder is opposite to that of the first dividing members on the other cylinder, when viewed down the axis on each cylinder from the same end of each cylinder. As illustrated in FIG. 9A, the first dividing members on the left hand cylinder form a left handed helix, while the first dividing members on the right hand cylinder form a right handed helix. The pitch of the helix of each first dividing member is preferably the same to ensure engagement along the entire length of each first dividing member. As shown in FIG. 9A, four first dividing members (21) are present on each cylinder (91). Preferably, five or more, preferably six or more first dividing members (21) are present on each cylinder (91). This has been found to be preferred, since, in use, a divide, or seal, can be formed in the tube at all times when the cylinders are rotated. As mentioned, second dividing members (22) are also present on the cylinder (91). A second dividing member (22) is disposed adjacent each first dividing member. Both first and second dividing members are preferably made from resilient materials. The second dividing members are preferably made of a material that is more compressible than the material of the first dividing member, i.e. for a given force per unit area and same resting thickness, the material of the second dividing member will compress to a smaller thickness than the material of the first dividing member. As can be seen in the figures, the cross sectional shape of both first and second dividing members is generally trapezoid, with the sides tapering outwards from the surface of the cylinder. The edges of the first and second dividing members are chamfered to improve engagement.

The invention claimed is:

1. A toilet, comprising:
   an aperture located in an upper part of the toilet;
   a dispenser arranged beneath the aperture for dispensing a tube of collection bag material in a downward direction;
   a first dividing means, the first dividing means adapted to simultaneously draw the tube downwards and create the divide in the tube by pressing the sides of the tube together, wherein the divide prevents solid waste and odor passing through the divide, while allowing liquid to pass, and the divide created by the first dividing means extends across at least part of the width of the tube;
   wherein the first dividing means comprises first and second movable conveyors for accepting the tube between them, each of the first and second conveyors having a plurality of corresponding first dividing members thereon, adapted such that, on moving the conveyors in a certain direction, one or more first dividing members from the first conveyor engages with one or more corresponding first dividing members from the second conveyor to press the sides of the tube together to form the divide in the tube and draw the tube downwards; and
   the first dividing members on the first and second conveyors each have a first and second portion, wherein the first portion is elongated and when the one or more first dividing members on the first conveyor engage with the one or more corresponding first dividing members on the second conveyor forming the divide in the tube, each of the first portions of the first dividing members on the first and second conveyor has upper surfaces that are angled downward from the horizontal, said angle being in the range of more than 0 to 30° from the horizontal, and each of the second portions is elongated and extends from the lower end of the first portion.

2. A toilet according to claim 1, wherein the first dividing means comprises two opposing first and second engagement means, the first and second engagement means, in use, located on opposite sides of the tube, the first and second engagement means movable from a first position to a second position to a third position, wherein in the first position the engagement means are sufficiently separated from one another such that they do not form a divide in the tube and in the second and third positions the engagement means are sufficiently close to one another that the divide is formed by pressing the sides of the tube together, the third position being located below the second position.

3. A toilet according to claim 2, wherein the engagement means are elongated and, at least in the second position, have an upper surface angled away from the horizontal, such that liquid waste can flow along the divide.

4. A toilet according to claim 1, wherein the first and second conveyors are driven on rollers having axes that, in use, are substantially horizontal, the first dividing members on the first and second conveyors are elongated and, when the one or more first dividing members on the first conveyor engage with the one or more corresponding first dividing members on the second conveyor forming the divide in the tube, the corresponding first dividing members on the first and second conveyor have upper surfaces that are angled downward from the horizontal, such that liquid waste can flow along the divide.

5. A toilet according to claim 1, wherein the first dividing members are adapted to form a permanent divide in the tube.

6. A toilet according to claim 5, wherein the permanent divide in the tube is formed by heat sealing the sides of the tube together.

7. A toilet according to claim 1, the toilet comprising a dividing means adapted to form a vertical divide in the tube as it is drawn downwards, to divide the tube into a first portion and a second portion.

8. A toilet according to claim 7, wherein the vertical divide formed in the tube is a permanent divide.

9. A toilet according to claim 1, wherein the toilet comprises a first dividing means comprising first and second movable supports having a plurality of corresponding first dividing members thereon, adapted such that, on moving the movable supports in a certain direction, one or more first dividing members from the first movable support engages with one or more first dividing members from the second movable support to press the sides of the tube together to form the divide in the tube and draw the tube downwards.

10. A toilet according to claim 9, wherein each of first and second movable supports comprises or is a rotatable body.

11. A toilet according to claim 10, wherein the rotatable body is a cylinder.

12. A toilet according to claim 11, where the first dividing means on each cylinder are helically arranged around each cylinder.

13. A toilet comprising:
an aperture located in an upper part of the toilet;
a dispenser arranged beneath the aperture for dispensing a tube of collection bag material in a downward direction;
a first dividing means, the first dividing means adapted to simultaneously draw the tube downwards and create a divide in the tube by pressing the sides of the tube together, wherein the divide prevents solid waste and odor passing through the divide, and the divide created by the first dividing means extends across at least part of the width of the tube;
wherein the first dividing means comprises first and second movable conveyors for accepting the tube between them, each of the first and second conveyors having a plurality of corresponding first dividing members thereon, adapted such that, on moving the conveyors in a certain direction, one or more first dividing members from the first conveyor engages with one or more corresponding first dividing members from the second conveyor to press the sides of the tube together to form the divide in the tube and draw the tube downwards; and
wherein the first and second conveyors have a plurality of second dividing members thereon adapted to act as a valve to allow liquid waste to flow downwards, and when liquid waste is not flowing downwards to the liquid storage means, form a divide in the tube.

14. A toilet comprising:
an aperture located in an upper part of the toilet;
a dispenser arranged beneath the aperture for dispensing tube in a downward direction;
a first dividing means, the first dividing means adapted to simultaneously draw the tube downwards and create the divide in the tube by pressing the sides of the tube together, wherein the divide prevents solid waste and odor passing through the divide, and the divide created by the first dividing means extends across at least part of the width of the tube;
wherein the first dividing means comprises first and second movable conveyors for accepting the tube between them, each of the first and second conveyors having a plurality of corresponding first dividing members thereon, adapted such that, on moving the conveyors in a certain direction, one or more first dividing members from the first conveyor engages with one or more corresponding first dividing members from the second conveyor to press the sides of the tube together to form the divide in the tube and draw the tube downwards; and
wherein the first and second conveyors have a plurality of second dividing members thereon, each of the second dividing members located adjacent to one of the first dividing members on the first and second conveyors such that when the first dividing member from the first conveyor engages with the corresponding first dividing member from the second conveyor, each of the first dividing members have upper surfaces angled downward from the horizontal, such that each first dividing member has an upper end and a lower end, and
the second dividing members are located at the lower end of the adjacent first dividing members on the first and second conveyors, and the second dividing members on the first and second conveyors, in a first position, engage to form a divide in the tube by pressing the sides of the tube together, and, in a second position, allow liquid water to flow.

15. A toilet according to claim 14, wherein the second dividing members are biased toward the first position.

16. A toilet, comprising:
a dispenser arranged in an upper part of the toilet for dispensing a tube of collection bag material in a downward direction;
a first movable support belt driven by a first roller and supporting a plurality of first dividing members;
a second movable support belt driven by a second roller and supporting a plurality of second dividing members;
the first dividing members and second dividing members each having a first portion and second portion;
the first roller rotating about a first axis and the second roller rotating about a second axis, the first axis and the second axis being parallel and arranged such that as the first movable support belt and the second movable support belt move,
the tube of collection bag material is moved downward and pressed together between at least one first portion from at least one first dividing member and at least one first portion from at least one second dividing member to form a first divide in the tube that prevents solid waste and odor passing through the first divide and
the tube of collection bag material is positioned between at least one second portion from at least one first dividing member and at least one second portion from at least one second dividing member to form a second divide to serve as a valve in the tube to allow liquid waste to flow downwards.

17. A toilet according to claim 16, wherein each movable support belt is driven by two rollers.

18. A toilet according to claim 16, wherein each first portion is elongated and when the first portions press together to form a first divide in the tube each of the first portions has upper surfaces that are angled downward from the horizontal, said angle being in the range of more than 0 to 30° from the horizontal, and the respective second portions extend from the lower end of the corresponding first portion.

19. A toilet according to claim 16, wherein when each second portion is positioned to form a second divide to serve as a valve in the tube to allow liquid waste to flow downwards, the sides of the tube are positioned to prevent odor passing through the second divide.

20. A toilet according to claim 16, wherein the dispenser has an annular shape.

* * * * *